United States Patent [19]

Ishida

[11] 4,404,245
[45] Sep. 13, 1983

[54] PROTECTIVE SHEET FOR CASSETTE HOLDING MAGNETIC RECORDING TAPE

[75] Inventor: Toshihiko Ishida, Tokyo, Japan

[73] Assignee: TDK Electronics Co., Ltd., Tokyo, Japan

[21] Appl. No.: 263,599

[22] Filed: May 14, 1981

[30] Foreign Application Priority Data

Jun. 2, 1980 [JP] Japan .............................. 55-75181[U]

[51] Int. Cl.³ ........................ B32B 3/00; B32B 27/14; G11B 5/78
[52] U.S. Cl. .................................... 428/206; 360/134; 427/189; 427/191; 427/192; 427/197; 427/201; 428/143; 428/148; 428/149; 428/204; 428/207; 428/212; 428/238; 428/331; 428/692; 428/694

[58] Field of Search ........ 427/197, 201, 180, 189–192; 428/144, 145, 204, 206–210, 328, 331, 694, 143, 147, 148, 149, 212, 692; 360/134

[56] References Cited

U.S. PATENT DOCUMENTS

| 3,561,337 | 2/1971 | Mulkey | 428/328 |
| 3,770,478 | 11/1973 | Bishop | 428/480 |
| 3,887,744 | 6/1975 | Tomita et al. | 428/208 |
| 4,146,031 | 3/1979 | Fujiyama et al. | 428/331 |
| 4,302,523 | 11/1981 | Audran et al. | 428/900 |

Primary Examiner—Bruce H. Hess
Attorney, Agent, or Firm—Oblon, Fisher, Spivak, McClelland & Maier

[57] ABSTRACT

A protective sheet for a cassette holding a magnetic recording tape comprises a transparent base which is coated with a hardened surface layer formed by bonding hard fine particles with a binder.

6 Claims, 6 Drawing Figures

PROTECTIVE SHEET FOR CASSETTE HOLDING MAGNETIC RECORDING TAPE

BACKGROUND OF THE INVENTION

1. Field of the Invention

The present invention relates to a protective sheet for a cassette holding a magnetic recording tape.

2. Description of the Prior Arts

Recently, many cassettes holding a magnetic recording tape have been prepared by molding a hausing part of a cassette with a transparent resin or a colored transparent resin in view of a function for a confirmation of a residual portion of the tape and a good appearance. In such transparent cassette, it is usual to place a protective sheet such as transparent plastic sheet between a side surface of a wound tape and an inner surface of a hausing of the cassette so as to form a uniform winding and to rotate smoothly the tape in the cassette. Thus, the transparent protective sheet is easily an abrasion by a friction caused by direct contact with an end of the magnetic recording tape and a core hub of the tape.

The abrasion of the transparent protective sheet cause a deterioration of transparency of the protective sheet whereby the easy confirmation of the residual tape in the cassette having the transparent hausing part and the good appearance as the desired purposed of the transparent hausing part is reduced and moreover a powder of the protective sheet caused by the abrasion is adhered on a running tape to cause drop-out. Moreover, the friction between the magnetic tape and the protective sheet is increased to cause an increase of tape winding torque and an increase of flatter whereby important recording and reproducing characteristics are deteriorated.

A protective sheet prepared by dispersing an abrasive in polytetrafluoroethylene is disclosed in Japanese Patent Publication No. 10484/1976. The protective sheet is not transparent and moreover, the preparation of the protective sheet is not easy and is expensive to remarkably wear the screw for blending. In the protective sheet, hard abrasive grains are incorporated inside of the protective sheet to reduce abrasive grains placed on the surface of the protective sheet with which the magnetic recording tape is directly brought into contact.

SUMMARY OF THE INVENTION

It is an object of the present invention to overcome the disadvantages of a transparent protective sheet placed between the cassette hausing and the side surface of the wound magnetic recording tape.

It is another object of the present invention to provide a transparent and durable protective sheet which is easily prepared.

The foregoing and other objects of the present invention have been attained by providing a protective sheet which comprises a transparent base sheet coated substantially or partially in a desired pattern with hard fine particles to form a hardened surface layer.

DETAILED DESCRIPTION OF THE PREFERRED EMBODIMENTS

The protective sheet of the present invention will be illustrated in detail.

Figure 1:
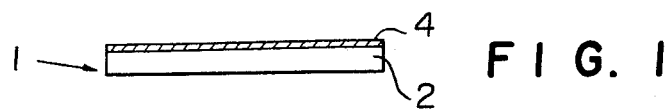
FIG. 1 is a sectional view of a protective sheet according to the present invention.
Figure 2:
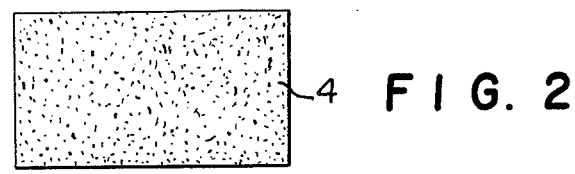
FIG. 2 is a plane view of the protective sheet of FIG. 1.
Figure 3A:
FIGS. 3 (a) and (b) and FIGS. 4 (a) and (b) are respectively sectional views and plane views of the other embodiments of the protective sheet according to the present invention to show coating patterns of the hardened surface layer.
Figure 3B:
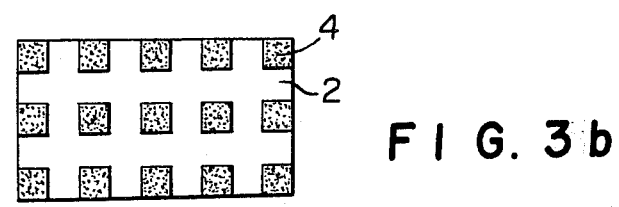
Figure 4A:
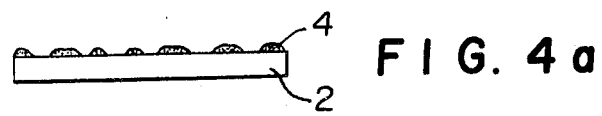
Figure 4B:
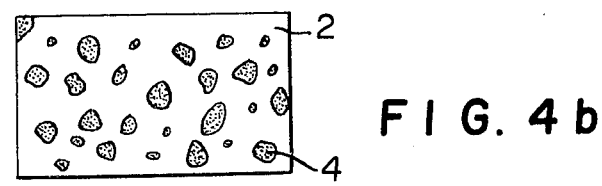

As shown in FIG. 1, the protective sheet (1) comprises a transparent base (2) and a hardened surface layer (4) formed by coating on the base (2). The hardened surface layer (4) can be uniformly coated on the whole of one surface of the base (2) as shown in FIG. 2. It is also possible to coat in a lattice pattern as shown in FIGS. 3 (a), (b) or in a random pattern as shown in FIGS. 4 (a), (b) in view of slippage of the protective sheet. As a result of the experiments, it is found that the coating in the lattice pattern for the hardened surface layer is preferable in view of the reduction of a contact area of the magnetic recording tape and a reduction of friction coefficient.

The base (2) is preferably a transparent synthetic resin film such as a polyethyleneterephthalate sheet.

The surface hardened layer (4) is formed by binding hard fine particles as the surface hardening material with a binder. The surface hardening material is one of abrasives and has an effect for wearing the magnetic recording tape. It is important to carefully select it. Suitable surface hardening materials include $Al_2O_3$, SiC, $TiO_2$, aluminum hydroxide, aluminum silicate, calcium silicate and $SiO_2$. Thus, the surface hardened layer is remarkably hard in the case of a large content of $Al_2O_3$ or SiC. This causes a tendency for wearing the base film and the magnetic powder at the side part of the magnetic recording tape which contacts with the hardened surface layer. On the other hand, when the surface hardening material is made of only $SiO_2$, the damage of the magnetic recording tape is not substantially found, however, the abrasion is easily formed on the protective sheet. As a result of various studies and experiments, it is found that a mixture of the surface hardening materials is preferably used. A mixture of $Al_2O_3$, $TiO_2$ and $SiO_2$ especially at ratios of $Al_2O_3:TiO_2:SiO_2$ of 10:10:80 by weight is used. The ratios of $Al_2O_3:TiO_2:SiO_2$ can be preferably varied in ranges of 2 to 30:0 to 30:98 to 50. The other hard particles can be used instead of $Al_2O_3$ and the other soft particles can be used instead of $SiO_2$.

The combination and the ratios of the surface hardening materials are not critical and can be selected as desired.

Suitable binders can be polyester type binders especially Desmohen #650, #800, Polyester #1100, #1700 and #2200 manufactured by Bayer. A smaller numeral designates higher hardness, but lower durability. A larger numeral designates softer but higher durability. In view of the adhesiveness and the flexibility of the sheet, it is optimum to use the polyester having a middle hardness such as Desmohen #800 to #1700. As the binder, the other polyesters such as Baylon #200, #300 and #500 manufactured by Toyo Boseki Co.

A ratio of the surface hardening material (P) to the binder (B) as (P/B) is preferably in a range of ½ to 1/10 to impart excellent adhesiveness.

When the binder is made of the resin similar to the resin of the transparent base (2), the surface property of the transparent base is advantageously improved to increase the transparency even though the surface property of the transparent base is inferior.

The hardened surface layer is formed in a thickness of 0.5 to 100μ by the coating to impart the function for surface protection and hardening of the base (2). In view of the flexibility of the protective sheet (4), it is preferable be formed in a thickness of 1 to 20μ.

The protective sheet of the present invention has the above-mentioned structure and accordingly, it is easily prepared and it has excellent durability and it maintains transparency and it is effective to protect the magnetic recording tape to be remarkably effective in a practical application.

I claim:

1. A protective sheet for a cassette holding a magnetic recording tape which comprises a transparent base which is coated with a hardened surface layer formed by bonded hard fine particles made of a mixture of $Al_2O_3$, $TiO_2$ and $SiO_2$ with a binder wherein a ratio of said hard fine particles to said binder is in a range of about $\frac{1}{2}$ to about 1/10 by weight.

2. The protective sheet according to claim 1 wherein said transparent base is a synthetic resin film and said binder for forming said hardened surface layer is a synthetic resin which is similar in properties to said base film.

3. The protective sheet according to claim 1 wherein said hardened surface layer is substantially uniformly coated on said transparent base.

4. The protective sheet according to claim 1 wherein said hardened surface layer is coated on said transparent base in a lattice pattern.

5. The protective sheet according to claim 1 wherein said hardened surface layer is prepared by coating on said transparent base in random pattern.

6. A protective sheet of claim 1 wherein proportions by weight of $Al_2O_3:TiO_2:SiO_2$ in said mixture is about 2 to 30:0 to 30:98 to 50.

* * * * *